(12) United States Patent  
Tsai et al.

(10) Patent No.: US 7,317,935 B2  
(45) Date of Patent: Jan. 8, 2008

(54) RADIO RECEIVER

(75) Inventors: Hsiao-Ping Tsai, Kawasaki (JP); Kazuhiko Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 11/080,495

(22) Filed: Mar. 16, 2005

(65) Prior Publication Data

US 2006/0099925 A1     May 11, 2006

(30) Foreign Application Priority Data

Nov. 8, 2004 (JP) ............................. 2004-324394

(51) Int. Cl.
H04B 1/38 (2006.01)
H04M 1/00 (2006.01)

(52) U.S. Cl. ................... 455/562.1; 455/277.1
(58) Field of Classification Search ................ 455/561, 455/562.1, 574, 272, 273, 277.1, 277.2, 280; 370/280, 294
See application file for complete search history.

(56) References Cited

U.S. PATENT DOCUMENTS

| 4,580,289 A | 4/1986 | Enderby |
| 5,832,375 A | 11/1998 | Leisten et al. |
| 6,252,548 B1 | 6/2001 | Jeon |
| 6,351,502 B1 | 2/2002 | Zargari |
| 6,477,148 B1 | 11/2002 | Gardenfors et al. |
| 6,728,517 B2 | 4/2004 | Sugar et al. |
| 2003/0002604 A1* | 1/2003 | Fifield et al. ............... 375/347 |
| 2004/0017785 A1* | 1/2004 | Zelst ........................ 370/328 |
| 2007/0121768 A1* | 5/2007 | Rooyen ...................... 375/347 |

OTHER PUBLICATIONS

Dodds, "Sampling and Pulse Amplitude Modulation", University of Saskatchewan, Canada, http://www.engr.usask.ca/classes/EE/352/2005/Ch/Ch4-PAM-04h04.pdf (2005).

* cited by examiner

Primary Examiner—Nguyen T. Vo
(74) Attorney, Agent, or Firm—Arent Fox, LLP

(57) ABSTRACT

In a radio receiver according to the present invention, an N:1 multiplexer multiplexes N signals received through N receiver antennas into one output, and a downconverter downconverts the combined signals into baseband signals, and two 1:N analog demultiplexers demultiplex the N combined and downconverted received signals into in-phase signal elements of N received signals and quadrature-phase signal elements of N received signals.

37 Claims, 15 Drawing Sheets

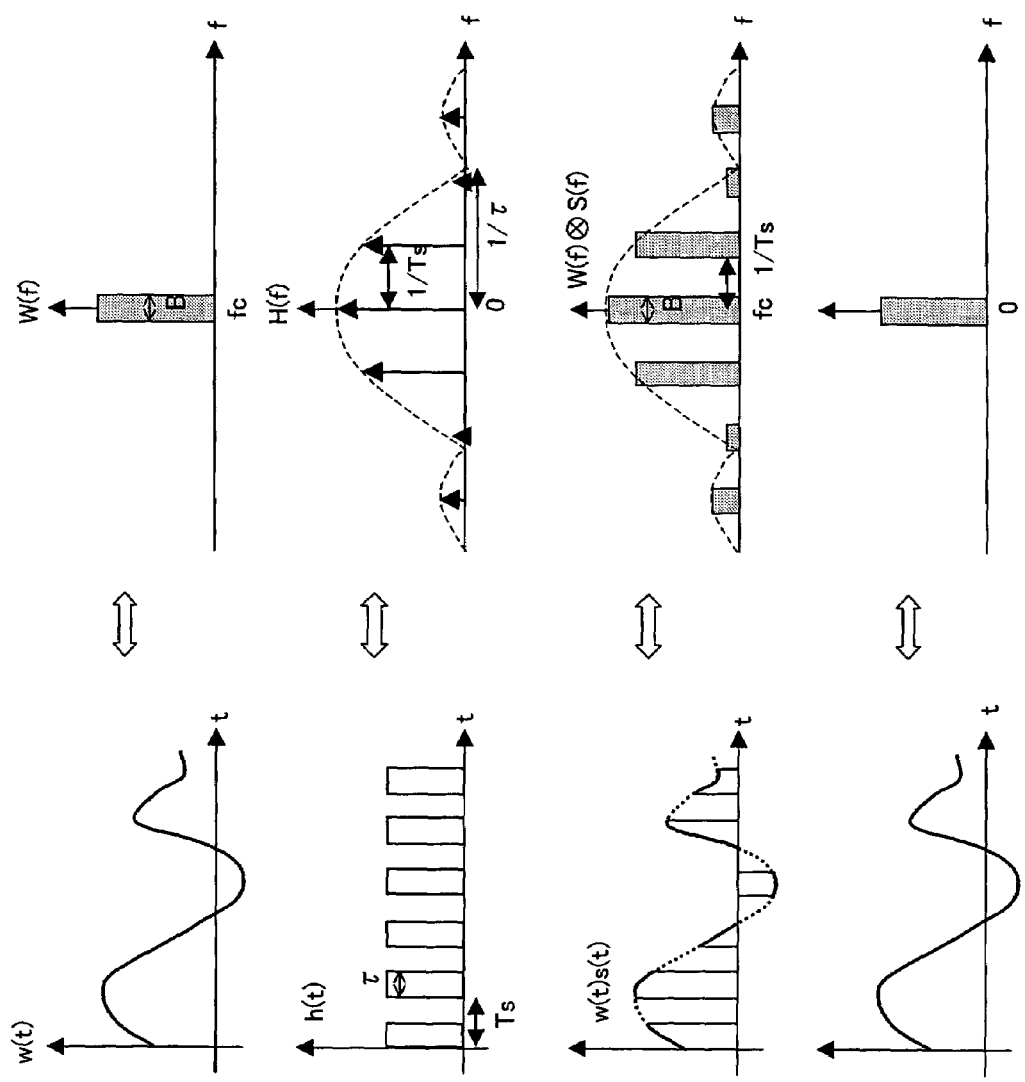
F I G. 2

Sampling rate, fs = 1/ Ts > 2 * signal bandwidth
Pulse width, $\tau \leq \tau_0$ = Ts / 4
Delay, 0 < d < Ts. The value depends on the delay between the multiplexer and demultiplexer

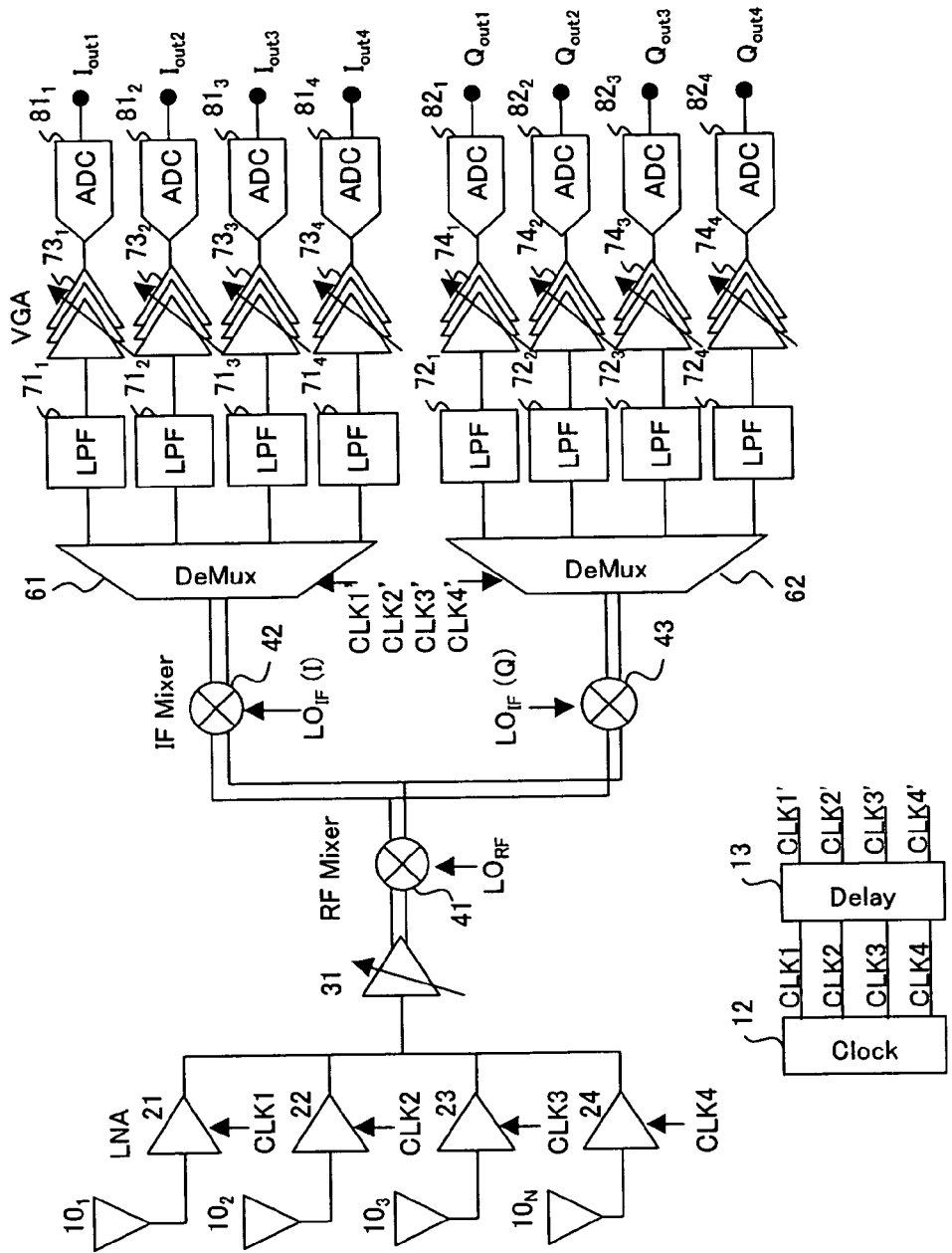
F I G. 7

RADIO RECEIVER

CROSS-REFERENCE TO RELATED APPLICATIONS

This application is based upon and claims the benefit of priority from the prior Japanese Patent Application No. 2004-324394, filed in Nov. 8, 2004, the entire contents of which are incorporated herein by reference.

BACKGROUND OF THE INVENTION

1. Field of the Invention

The present invention relates to a radio receiver, and more specifically to the configuration of an RF front-end receiving unit of a radio receiver used in a MIMO system or a SIMO system.

2. Description of the Related Art

Wireless communication systems have grown rapidly because of advantages such as mobility, flexibility, and inexpensive network configuration. In wireless systems, there are three major impairments associated with radio channels: fading, delay spread, and co-channel interference. In order to achieve high-speed, high-quality and high-capacity communications, countermeasures should be employed to combat these impairments. MIMO (multiple-input multiple-output) technology has drawn increasing attention since it can provide radio channels capable of transferring information in parallel within a given bandwidth and significantly increase the attainable capacity. It is currently being used for third-generation cellular systems (W-CDMA) and its adoption for future high-performance modes of the highly successful IEEE 802.11 standard for wireless local networks (WLAN) and 3.5-generation cellular system such as High Speed Downlink Packet Access (HS-DPA) is under discussion.

MIMO-related topics also occupy a considerable part of today's academic communications research. MIMO wireless systems are those that have multiple antenna elements at both the transmitter and receiver. The extra degrees of freedom afforded by the multiple antennas can be used for increasing bit rates in two different ways. One is the creation of a highly effective antenna diversity system; the other is the use of the multiple antennas for the transmission by several parallel data systems to increase the capacity of the system.

FIG. 1 shows the configuration of the MIMO system in a conventional wireless system. The MIMO system shown in FIG. 1 has M transmitter antennas and N receiver antennas $1_1, 1_2, 1_3 \ldots 1_N$. M different data streams are transmitted from M transmitter antennas in parallel, and received by N receiver antennas in parallel (simultaneously). The received RF signals are downconverted to baseband signals (in-phase signal element and quadrature-phase signal element) in N front-end circuits (downconverters) $2_1, 2_2, 2_3 \ldots 2_N$ provided corresponding to N array antennas. Then, since the output of the in-phase signal elements of the downconverters pass through low-pass filters (LPF) $3_1, 3_2, 3_3 \ldots 3_N$, they are filtered and simultaneously their waveforms are restored to the original state. Similarly, since the output of the quadrature-phase signal elements of the downconverters pass through low-pass filter (LPF) $4_1, 4_2, 4_3 \ldots 4_N$, they are filtered and simultaneously their waveforms are restored to the original state. The filtered signals are converted to digital signals in 2N A/D converters (ADC) $5_1, 5_2, 5_3 \ldots 5_N$, and $6_1, 6_2, 6_3 \ldots 6_N$ after passing the LPFs.

The above-mentioned MIMO system is disclosed by, for example, the following patent literature 1 and 2.

[Patent Literature 1] U.S. Patent Document No. 6,252,548 "Transceiver Arrangement for A Smart Antenna System in A Mobile Communication Base Station"

[Patent Literature 2] U.S. Patent Document No. 6,728,517 "Multiple-Input Multiple-Output Radio Transceiver"

In the conventional MIMO system, when a receiver antenna is expanded, a newly added unit is provided with the component of an RF front-end unit, for example, a downconverter, and this causes increased complexity of the system configuration, higher power consumption, higher fabrication costs, expansion of the system configuration, and increase in related cabling requirements, thus making physical configuration of the system difficult. The rapid growth of the wireless communication market has created the need for low cost, compact, and low power circuits. However, the conventional MIMO system cannot support the above-mentioned demand, and further the conventional SIMO (Single-Input Multiple-Output) system has similar problems.

SUMMARY OF THE INVENTION

The present invention aims at providing a radio receiver having a simple and low power consumption RF front-end unit for use in a MIMO system or a SIMO system.

The radio receiver according to the present invention includes: an antenna array having N (N is an integer$\geq 2$) antenna elements for receiving an RF signal; an N:1 multiplexer, for multiplexing N channel signals received via the N antenna elements into one signal; a downconverter, for downconverting the multiplexed signal to a baseband; two 1:N analog demultiplexers, for demultiplexing N combined and downconverted received signals into N in-phase signal elements and N quadrature-phase signal elements; 2N low-pass filters, for filtering and reconstructing a baseband signal of the N in-phase signal elements or the N quadrature-phase signal elements; and 2N A/D converters, for converting a reconstructed received signal to a digital signal.

In the radio receiver according to the present invention, an N:1 multiplexer multiplexes N signals received through N receiver antennas into one output, and a downconverter downconverts the combined signals to baseband signals, and two 1:N analog demultiplexers demultiplex the N combined and downconverted received signals into in-phase signal elements of N received signals and quadrature-phase signal elements of N received signals. Thus, since the combined signals of received signals are downconverted in the downconverter, the configuration of the RF front-end unit can be simplified and power consumption is reduced as compared with the conventional (MIMO or SIMO) systems which downconvert signals for each of the receiving units.

According to the present invention, since the downconverter downconverts combined received signals, the configuration of the RF front-end unit can be simplified as compared with the conventional (MIMO or SIMO) system which performs downconversion on each receiving unit signal.

Furthermore, since the number of parts is reduced according to the present invention, the entire system requires reduced power consumption.

BRIEF DESCRIPTION OF THE DRAWINGS

FIG. 2 shows the waveform of a signal and its corresponding spectra during various stages of signal processing; the first stage (top) shows the envelope of a modulated signal waveform w(t) whose bandwidth is W and carrier frequency is fc. The second stage shows a rectangular pulse sequence used to sample the waveform w(t) of the first stage, the third stage shows a wave form envelope after sampling, and the final stage shows a waveform downconverted from the third stage to the baseband and removal of a replica (spectrum);

FIG. 7 shows an example of a case in which N=4 in the receiver shown in FIG. 5;

DESCRIPTION OF THE PREFERRED EMBODIMENTS

Figure 1:
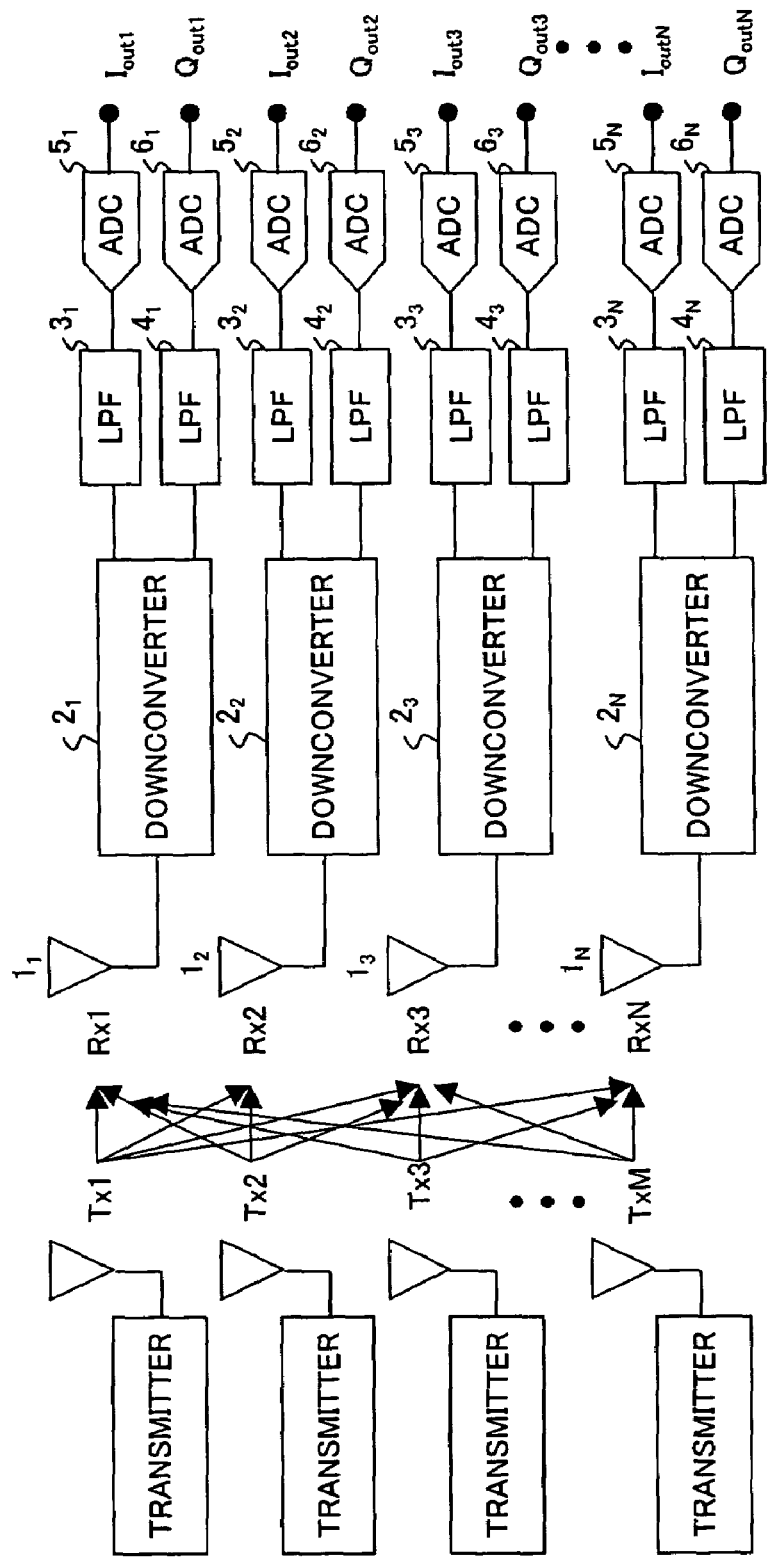
FIG. 1 shows the configuration of a MIMO system in a conventional wireless system.

The embodiments of the present invention are described below in detail by referring to the attached drawings.

In the embodiments of the present invention, the configuration of the RF front-end unit of a receiver used in the MIMO system or the SIMO system is proposed. With such a configuration, a reduction in the total number of necessary RF front-end components is proposed to reduce the circuit size and power consumption.

With the above-mentioned configuration, at least two received RF signals are sampled by passive switches or active switching amplifiers near the antenna before downconversion, by subsampling technology. All (received) signals are sampled without overlapping (overlaying) by triggering control signals of the sampling switches or amplifiers. When the sampled signals are directly combined, the process is equivalent to the technology of time division multiplexing (TDM).

That is, the sampling of a received signal detected by each antenna element is interleaved (overlaid) by different time slots. Therefore, the multiplexed signals can pass through one path of the front-end circuit. The path is typically configured by a downconversion mixer and one or more low noise amplifiers (LNA). After the downconversion, multiplexed signals are de-interleaved (demultiplexed, or separated by releasing the overlaid status), and reconstructed by passing through appropriate low-pass filters.

The embodiments of the present invention are described below in the order of 1. Sampling Theorem, 2. Pulse Amplitude Modulation (natural sampling), 3. Time Division Multiplexing, 4. Configuration (architecture), and 5. Simulation Result.

1. Sampling Theorem

In the proposed configuration, the concept of subsampling is implemented to avoid a duplicated (same circuit provided for each receiver) RF front-end circuit. When the Nyquist sampling theorem is applied, an RF signal can be completely represented by the samples obtained at a rate at least double the bandwidth of a signal.

That is, the minimum sampling frequency is related not to a carrier frequency, but to the bandwidth of a signal. The technology is referred to as bandpath-limited subsampling. A sampling frequency larger than twice the signal bandwidth leads to so-called oversampling which is defined as the ratio of the sampling rate to the signal bandwidth. Subsampling systems take advantages of the fact that radio signals have a narrower bandwidth than their carrier frequency in order to sample the signal at a lower frequency than that required by conventional sampling.

2. Pulse Amplitude Modulation (Natural Sampling)

Consider the waveform of a continuous information signal that represents, for example, voice or data. When a waveform is sampled by a sequence of on/off rectangular pulses, the resulting waveform is amplitude modulated. This process is known as pulse amplitude modulation (PAM) with natural sampling. A simple example illustrates the waveforms and associated spectra in FIG. 2. Shown at the top stage in FIG. 2 is an envelope of the modulated signal waveform of the carrier frequency fc with the bandwidth B. Shown at the second stage in FIG. 2 is a sequence of rectangular pulses having the period Ts and the pulse width $\tau$ for use in sampling the waveform shown at the top stage in FIG. 2. The spectrum corresponding to the periodic function also has the period of 1/Ts, and the envelope of the spectrum is a sinc function, that is, $\sin(\pi\tau f)/(\pi\tau f)$. The null of the envelope of the spectrum is located at $f=fc+N/\tau$, where N is an integer. Shown at the third stage in FIG. 2 is a waveform as a sampling result when the waveform at the top stage is sampled using the rectangular pulse at the second stage. The shape of the power spectrum is a repetition of the modulated spectrum centered at the carrier frequency. The envelope of the repetition follows a sinc square function and the nulls of the envelop are at $fc+N/\tau$, where N is an integer. The spacing between repeated spectra is due to periodic sampling at fs=1/Ts. If the sampled signal at the third stage shown in FIG. 2 is down converted to DC and low pass filtered, the original waveform can be reconstructed as shown at the bottom stage shown in FIG. 2. To filter unnecessary replicas, the cutoff frequency $f_{LPF}$ of the low-pass filter (LPF) must satisfy the condition $B/2 \leq f_{LPF} \leq \{2/Ts-B/2\}$.

3. Time Division Multiplexing

Figure 3:
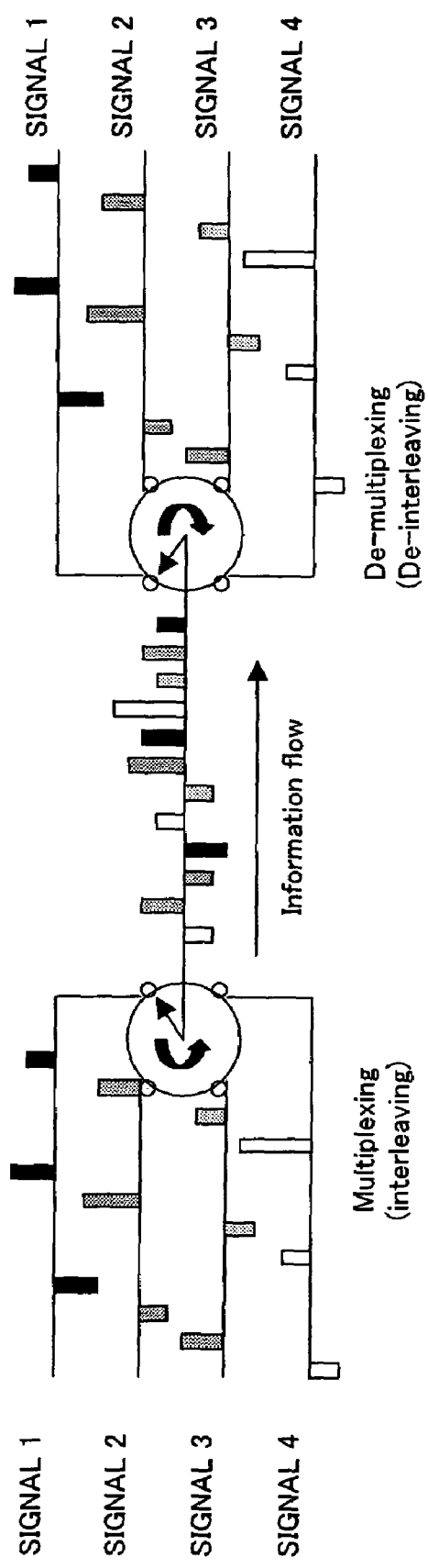
FIG. 3 is an explanatory view of the concept of time division multiplexing.

Consider a 4×4 MIMO system. This system is assumed to have four transmitter antennas and four receiver antennas. If the four received signals are subsampled without overlapping (overlaying), the resulting sampled signals are represented as the signals 1 through 4, as shown in FIG. 3. Using a multiplexer, one of the four signals can be periodically selected from the transmission path. This process is referred to as multiplexing or interleaving. At the end of the transmission path, the process is reversed. Combined signals are re-distributed to four different transmission paths. This process is referred to as demultiplexing or de-interleaving.

Figure 4A:
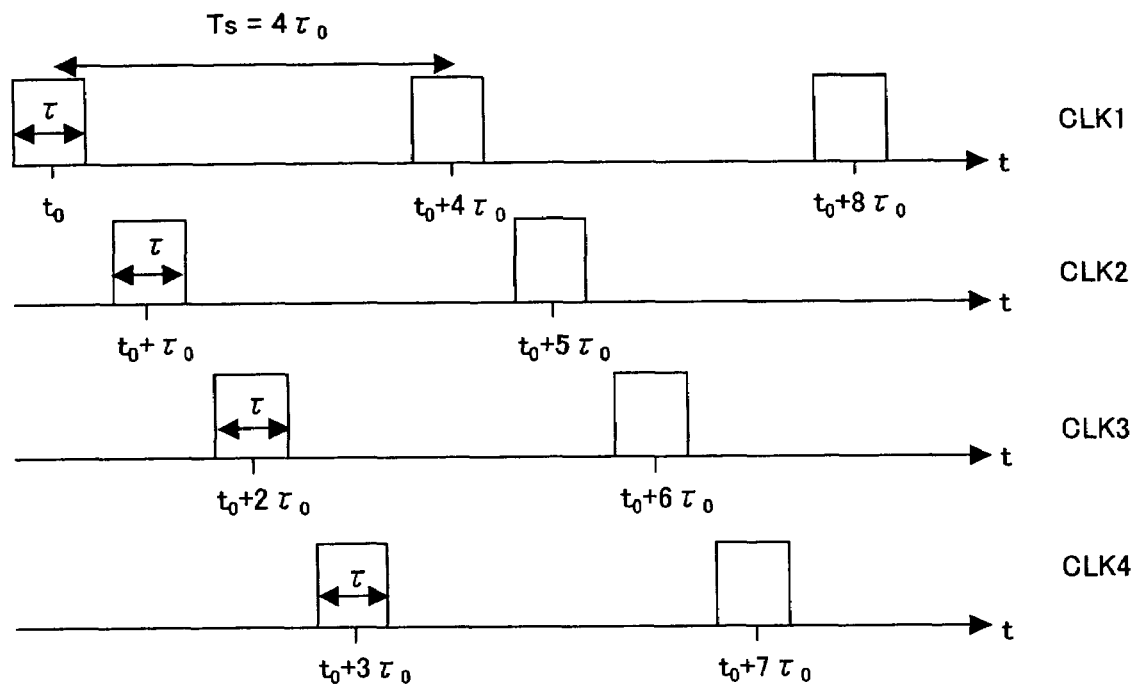
FIG. 4A shows the clock sequence used in sampling and interleaving (overlaying) signals by a multiplexer.

Four received signals contain the information from the four respective transmitters. If the four transmitters transmit the information at different data bandwidths, for example, one at 20 MHz, and the remaining 3 at 5 MHz, the subsampling rate requested by each receiver is to be higher than 40 MHz. It is double the largest data bandwidth. In different receivers (receiving units), there is no reason for setting different sampling rates, the simplest possible design is to synchronize received signals of the four receivers using the same sampling rates so that it is easy to demultiplex them. FIG. 4A shows four non-overlapping sampling pulses for use in a multiplexer. Each pulse has a period, Ts, and a pulse width, τ. In order to completely represent the RF modulated signal, the sampling rate, fs, must be at least twice as large as the signal bandwidth. That is, $$fs=1/Ts>2\times(\text{bandwidth of signal})$$

The condition for non-overlapping sampling pulses is provided by the following equation.

$$\tau \leq Ts/4$$

When the number of signals to be multiplexed is N, the condition for non-overlapping sampling pulses is provided by the following equation.

$$\tau \leq Ts/N$$

Figure 4B:
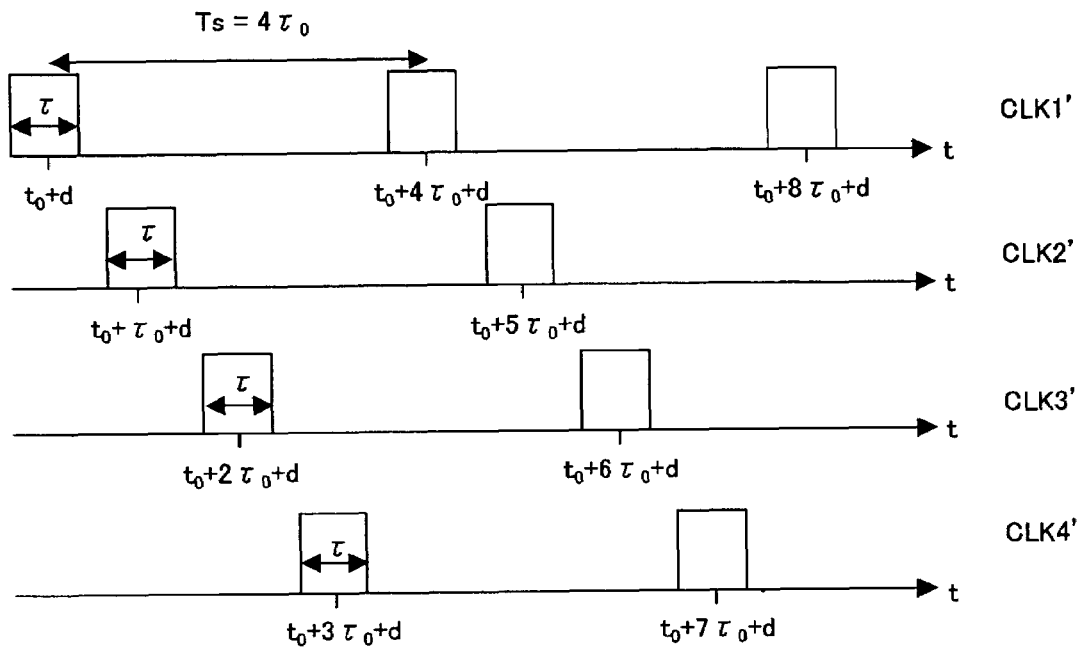
FIG. 4B shows the clock sequence used in de-interleaving (releasing and demultiplexing) signal by a demultiplexer.

FIG. 4B shows a non-overlapping pulse sequence for use in a demultiplexer. The difference between pulses shown in FIG. 4B and those shown in FIG. 4A is that the transmission delay between the multiplexer and the demultiplexer are taken into consideration to synchronize signals.

4. Configuration (Architecture)

Figure 5:
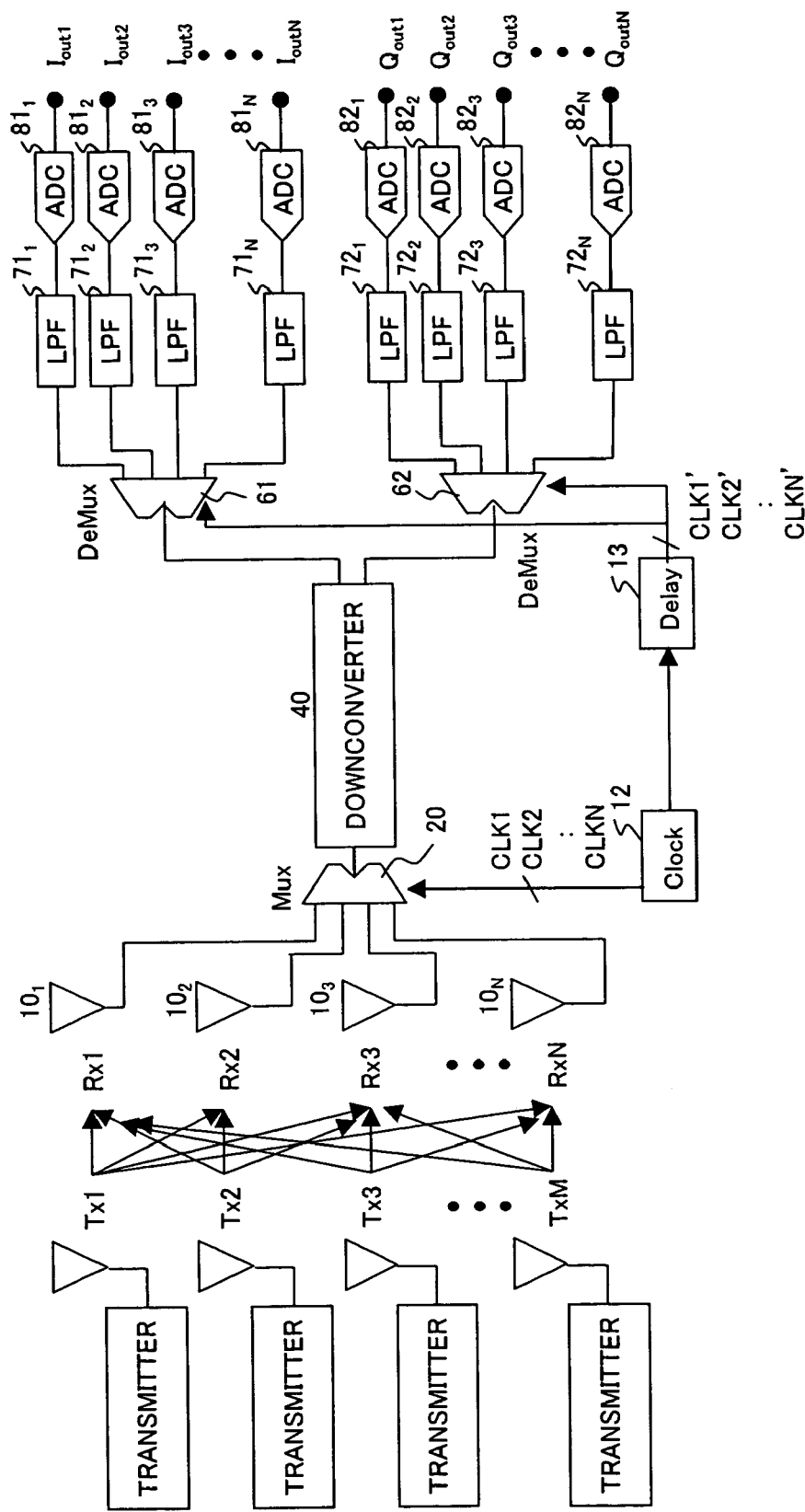
FIG. 5 shows the configuration of a receiver used in the MIMO system or the SIMO system according to an embodiment of the present invention.

The receiver system proposed as shown in FIG. 5 comprises: an antenna array having N (N is an integer≧2) antenna elements $10_1, 10_2, 10_3 \ldots 10_N$; an N:1 multiplexer 20, a downconverter 40, two 1:N demultiplexers 61 and 62, 2N baseband low-pass filters (LPF) $71_1, 71_2, 71_3 \ldots 71_N$, and $72_1, 72_2, 72_3 \ldots 72_N$, 2N A/D converters (ADC) $81_1, 81_2, 81_3 \ldots 81_N$, and $82_1, 82_2, 82_3 \ldots 82_N$, and a digital signal processor (clock generation circuit 12, delay circuit 13) for providing a control signal for the multiplexer 20 and the demultiplexers 61, 62.

When N antennas receive N signals, the N:1 multiplexer 20 samples incoming signals, and multiplexes the signals into one transmission path. The N:1 multiplexer 20 can be configured by N MOSFET switches or N switching LNAs. Further, the switches can be those other than MOSFET switches.

It is preferable to use an LNA as a switch to improve the signal-to-noise ratio. The high gain provided by an LNA lowers the noise contribution from the succeeding stages so that noise figure of entire system is reduced. A switch is easy to be implemented by an on/off gate of a transistor. Using a MOSFET provides fast switching speed because of the gate current is zero, the output currents of plurality of LNAs are easily combined and it is easy to be integrated into the same CMOS chip. By changing the gate bias of the MOSFET in the circuit, the MOSFET switches or the switching LNA can be turned on/off. When a switch is turned on, the switching LNA samples and amplifies an incoming signal. When a switch is turned off, the switching LNA is appropriately isolated from the other received signals and enters the off state.

For example, as shown in FIG. 4A, if the gate bias is controlled by N non-overlapping clock sequences $CLK_1$, $CLK_2, CLK_3 \ldots CLK_N$, only one signal is permitted to pass through a multiplexer by placing only one MOSFET switch or switching LNA in the on state, thereby avoiding the overlapping (overlaying) between two signals. The pulse sequence shown in FIG. 4B can be generated by a digital signal processor. Since the pulse sequence used by digital circuits such as, phase locked loops and A/D converters is periodic, it is hereinafter referred to as a clock sequence. In each MOSFET switch or switching LNA, a digital signal processor generates a clock sequence such that the clock rate is more than double the bandwidth of a (received) signal and lower than the carrier frequency, and the pulse width of a clock can be equal to or smaller than the value obtained by dividing the clock period by the number of antennas N.

The multiplexed signal is further converted to a baseband through the downconverter 40 using a direct conversion process or a multiple conversion process. The downconverter 40 can selectively include one or more LNAs for raising the signal-to-noise ratio to improve reception quality. Each LNA can be designed to have frequency selection LC loads to maximize the voltage gain of an RF frequency.

When a 1-stage mixing process is used, the downconverter 40 has a pair of quadrature-phase mixers for downmixing a received signal to in-phase and quadrature-phase baseband signals.

On the other hand, when the downconverter 40 uses a 2-stage mixing process, a received signal is converted to a common or walking intermediate frequency first through an RF mixer, and then converted to a baseband signal using a pair of quadrature-phase mixers. In the 2-stage mixing process, the downconverter 40 can provide an IF bandpass filter and an IF gain variable amplifier between an RF mixer and a pair of quadrature-phase mixers.

After a quadrature-phase downconversion, I-channel and Q-channel signals are de-interleaved (demultiplexed) by two corresponding demultiplexers. The 1:N demultiplexer 61 provided at the in-phase output terminal of a quadrature-phase mixer demultiplexes downconverted signals to N different in-phase signals. The 1:N demultiplexer 62 provided at the output terminal of the quadrature-phase of the quadrature-phase mixer demultiplexes downconverted signals to N different quadrature-phase signals. The output of N demultiplexers of the in-phase and quadrature-phase is controlled by N non-overlapping clock sequences $CLK_1'$, $CLK_2', CLK_3' \ldots CLK_N'$ as shown in FIG. 4B. The clock sequences which control the demultiplexers are synchronous with the N clock sequences $CLK_1, CLK_2, CLK_3 \ldots CLK_N$ which control the multiplexer. After the digital signal processor generates a clock sequence for multiplexing, it adds a transmission delay between the multiplexer and the demultiplexer (for example, corresponding to d shown in FIG. 4B) to generate N clock sequences $CLK_1', CLK_2', CLK_3' \ldots CLK_N'$, for demultiplexing. The 1:N analog demultiplexers 61 and 62 can be configured by, for example, a 1:N MOSFET switch.

The sampling theorem states that the complete regeneration of an original waveform, from a sampled sequence, using a low-pass filter is possible. The regeneration circuits of a baseband signal in both the in-phase and quadrature-phase paths are provided with one or more low-pass filters (LPF) to suppress unnecessary interference by removing replicas from a sampled signal. The cutoff frequency of these LPFs can be adjusted to the bandwidth of the data. The process circuits of a baseband signal in both the in-phase path and the quadrature-phase contain one or more variable gain amplifiers for adjusting the power of a (baseband) signal such that an appropriate level for A/D conversion can be obtained. After digitizing signals with a plurality of A/D converters, digital signal processing is performed to restore data to the original state.

Figure 6:
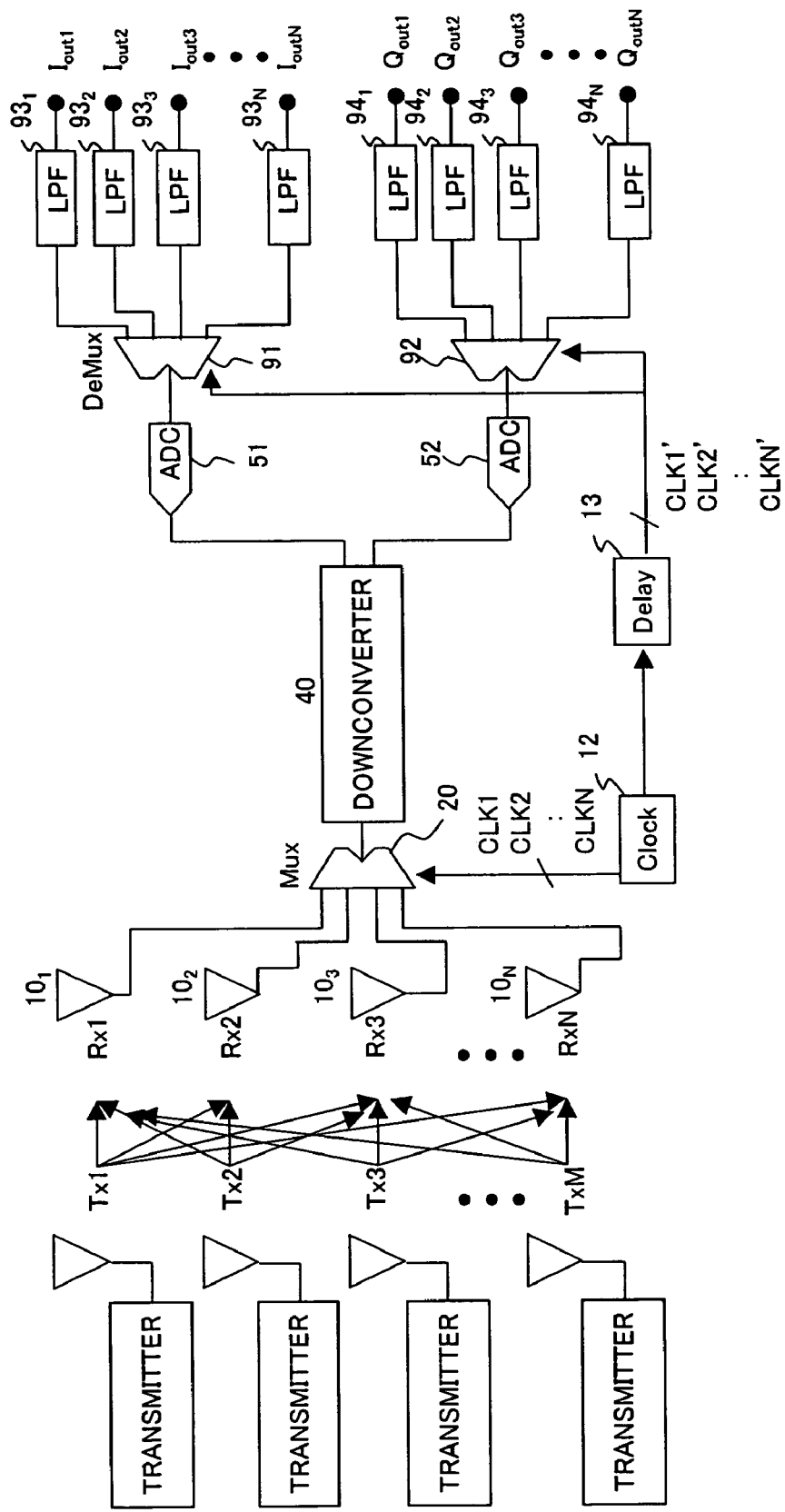
FIG. 6 shows the configuration of the receiver according to another embodiment of the present invention.

FIG. 6 shows the configuration of the receiver according to another embodiment of the present invention. It is the same as FIG. 5, except for the block after downconversion. After converting an RF signal to an IF or a baseband frequency, A/D converters 51 and 52 immediately convert the signals into a digital format. Demultiplexers 91 and 92, and low-pass filters $93_1, 93_2, 93_3 \ldots 93_N$, and $94_1, 94_2, 94_3 \ldots 94_N$ are implemented as a digital circuit module. The benefit of this approach is the accuracy and simplicity of the digital implementation of de-multiplexing and low pass filtering. The drawback of the approach is the required increase of the sampling speed of the A/D converters which increases the power consumed by the A/D converters. To store the necessary broadband of sampled information to restore signals, the sampling rate of A/D converter is to be at least N times higher than the sampling rate required by the configuration shown in FIG. 5. For example, when four receiver antennas are included, the sampling rate of the A/D converter shown in FIG. 6 is to be at least 4 times the sampling rate of the A/D converter shown in FIG. 5. With the configuration shown in FIG. 6, the number of antennas N is set in a range in which a sampling rate can be realized.

FIG. 7 shows an example of describing in detail the configuration shown proposed in FIG. 5. The number N of antenna elements is 4 in this example receiver. The multiplexer is realized by four switching LNAs 21, 22, 23, and 24. The N switching LNAs driven by N digital clocks (N=4 in this case) $CLK_1, CLK_2 \ldots CLK_N$ which are non-overlapping on/off pulse sequences, provides a device for combining N signals by interleaving in time the samples of N signals. The second stage of LNA 31 is selectively provided, raises the signal further above the noise floor, and improves the system characteristics of noise, linearity, and dynamic range.

The gain of the LNA 31 is controlled to provide high gain when the received signal power is too small and low gain to prevent the saturation of the downconverter in the subsequent stage when received signal power is large. When a MOSFET switch is used instead of the switching LNAs 21, 22, 23, and 24, the variable gain LNA 31 is responsible for SNR improvement by providing high gain and low noise figure.

When heterodyne conversion is implemented, and if N=4 with the configuration of the conventional technology shown in FIG. 1, four downconverters (RF front-end unit require 8 LNAs and twelve mixers. However, when the configuration shown in FIG. 7 is applied to the four receiver antennas, the downconverter 40 with the proposed configuration, requires only 5 LNA 21, 22, 23, 24 and 31 and three mixers (RF mixer 41, a pair of quadrature-phase mixers 42 and 43) are required. Therefore, the power consumption of the RF front-end unit is reduced. In FIG. 7, 2N variable gain amplifiers (VGA) $73_1, 73_2, 73_3 \ldots 73_N$, and $74_1, 74_2, 74_3 \ldots 74_N$ for adjusting the power level of a signal are provided between a low-pass filter (LPF) and an A/D converter (ADC).

With the configuration shown in FIG. 5 or 6, N bandpass filters for performing a filtering process on N received signals before the N:1 multiplexer samples N received signals can be further provided. With the configuration shown in FIG. 6, an anti-aliasing filter for attenuating frequency elements higher than the loop-back frequency can also be provided.

Furthermore, with the configuration shown in FIG. 5 or 6, a variable band BPF is connected to the output of each receiving antenna. With the configuration shown in FIG. 5 or 6, the feature of a BPF having a desired bandwidth can be added to the circuit consisting of LNAs.

5. Simulation Result

To confirm the proposed concept, a simulation is performed, and the results are presented. Transmission and restoration tests are made on digital data, and a bit error rate is measured to confirm that the modulated data has been accurately restored.

In the simulation, the transmission data is modulated in the OFDM format indicated by the "IEEE WLAN 802.111a Standard". The data source of the OFDM signal and the support in the digital domain are provided by a simulator library. The MIMO system of the simulation is provided with two transmitter antennas and two receiver antennas (M=N=2). Binary data modulated by random codes is transmitted from the first transmitter, and binary data modulated by a pseudo random bit sequence (PRBS)) is transmitted from the second transmitter. These transmission signals are modulated at 48 Mbps by the QAM64 of the OFDM format. The total number of sub-carriers is 52 for each OFDM symbol, and the bandwidth of a symbol is 16.25 MHz. The frequencies of the RF and LO are set to 5.2 GHz.

The sampling rate of the multiplexer is set to 80 MHz so that the period of the sampling sequence is 12.5 ns and the pulse width is ¼ of the period. The channel attenuation and the additive white Gaussian (AWGN) noise are also considered in the simulation.

Figure 8:
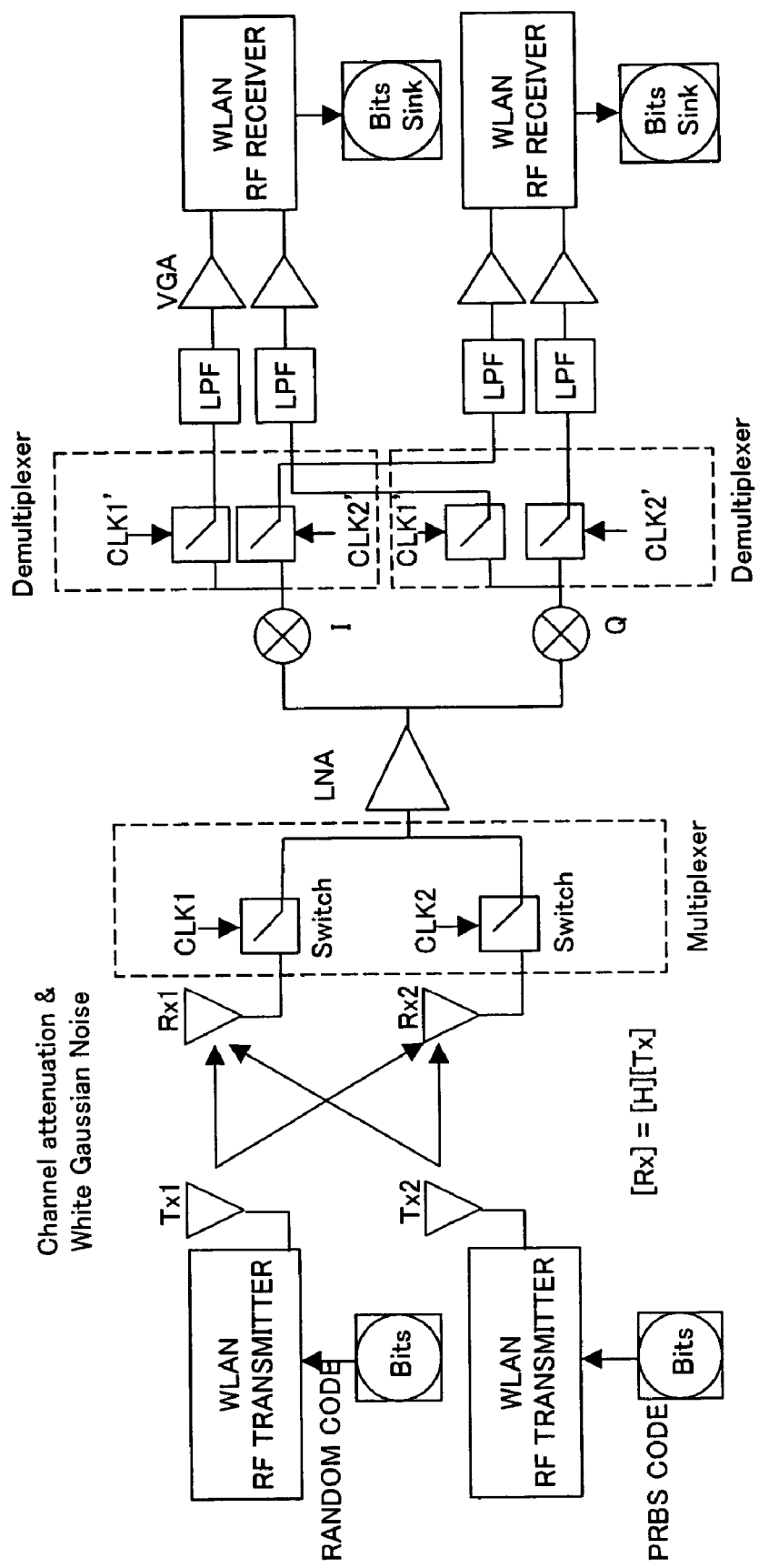
FIG. 8 shows the configuration of the system used in a simulation (N=2)

FIG. 8 shows the configuration of the system in the simulation. This system implements the configuration of a receiving unit shown in FIG. 5, and the direct conversion system is adopted in the downconversion. In the simulation, a received signal is represented by a complex number.

Figure 9A:
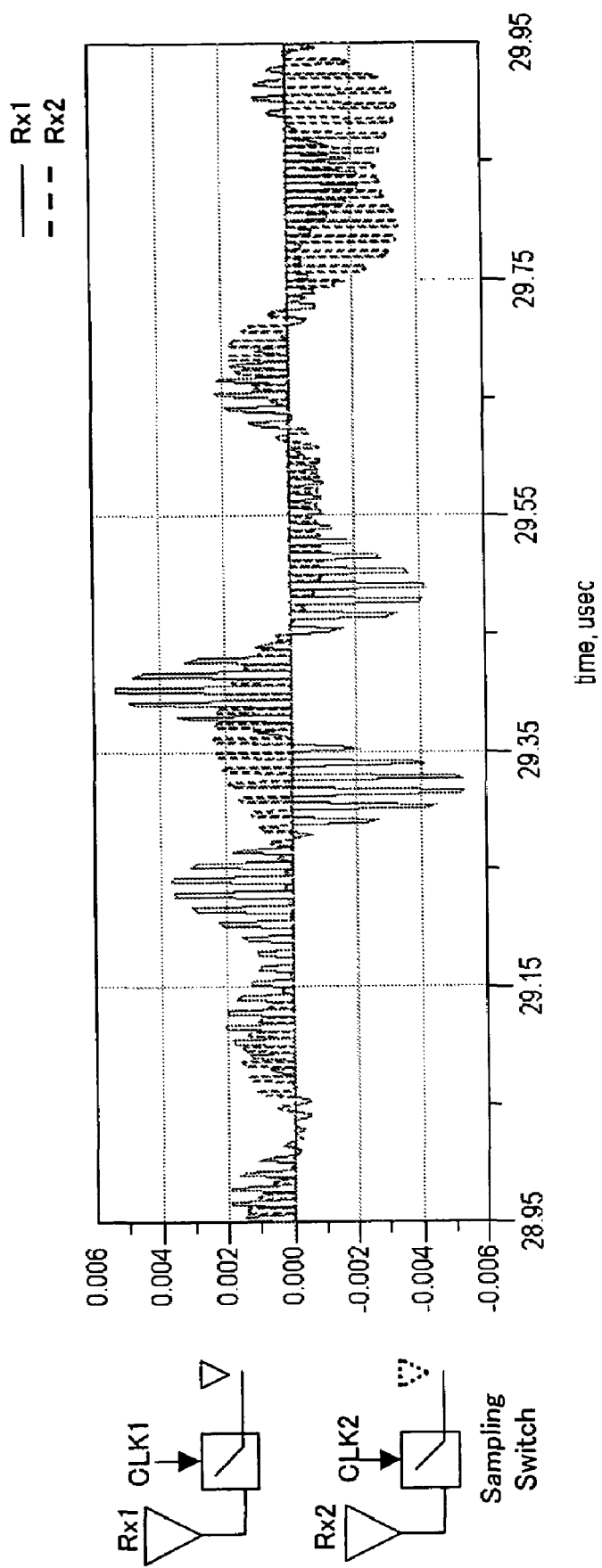
FIG. 9A shows the imaginary part of two sampled RF signals received through Rx1 and Rx2 (simulated)

FIG. 9A shows the imaginary part of a sampled RF signal (envelope). The first channel (solid line) and the second channel (broken line) at the output of the multiplexer are shown.

Figure 9B:
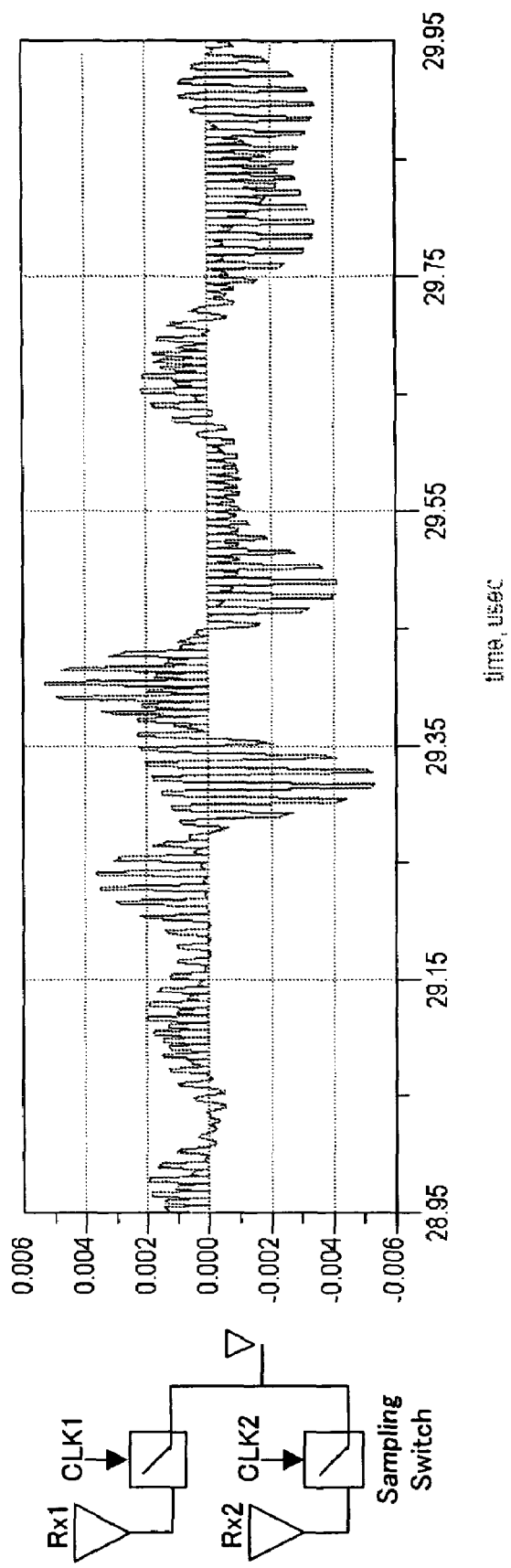
FIG. 9B shows the result obtained by summing the imaginary parts of the two RF signals (envelope) in FIG. 9A (simulated)

FIG. 9B shows the result obtained by adding the imaginary parts of the envelopes of the sampled RF signals shown in FIG. 9A. Since the two signals are sampled without overlapping, they occupy different time slots without interference with each other after interleaving.

Figure 9C:
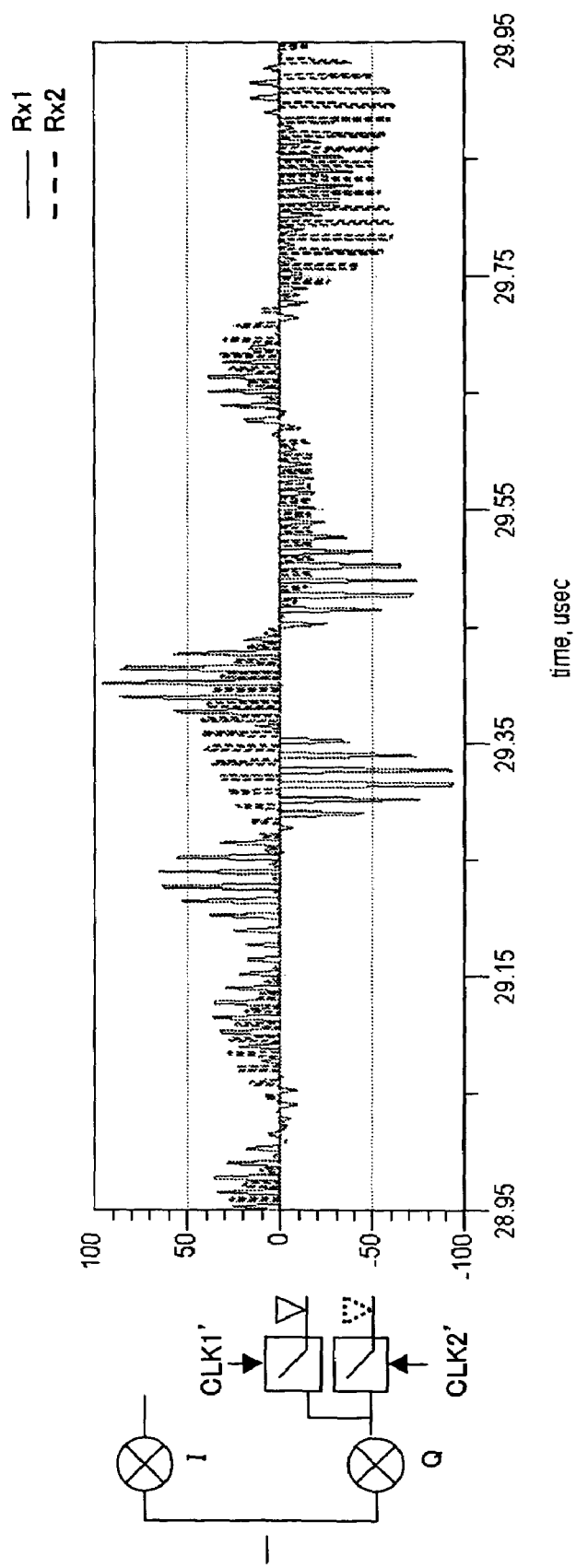
FIG. 9C shows the imaginary part of the two baseband signals (of a Q channel) demultiplexed by a demultiplexer (simulated)

FIG. 9C shows the imaginary part of the baseband signal (Q channel) after demultiplexing by the demultiplexer. By adjusting the phase of the clock sequence CLK1', CLK2' to be synchronized with the signals, the combined signals are consecutively de-interleaved to two transmission paths (the alternate overlapping is released and separated).

Figure 9D:
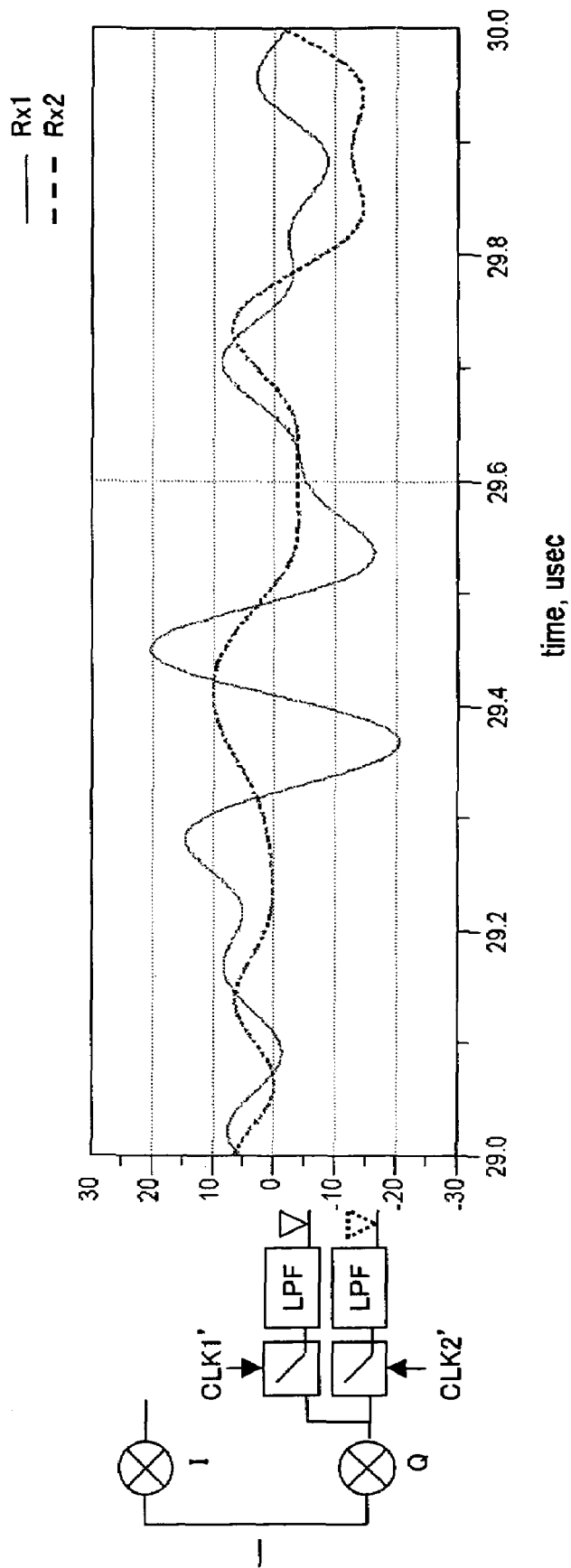
FIG. 9D shows the imaginary part of the baseband signal (of a Q channel) at the output of a low-pass filter (LPF) (simulated)

FIG. 9D shows the imaginary part of the-baseband signal at the output of the low-pass filter (LPF). In this example, the LPF generates a delay of 50 ns.

Figure 10:
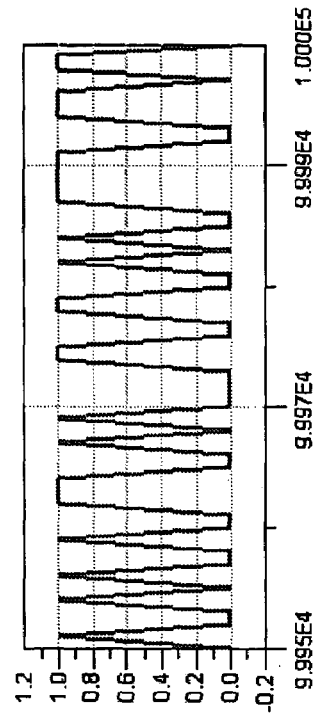
FIG. 10 shows binary data transmitted to the proposed radio receiver, and the simulation results of reception.
Figure 10:
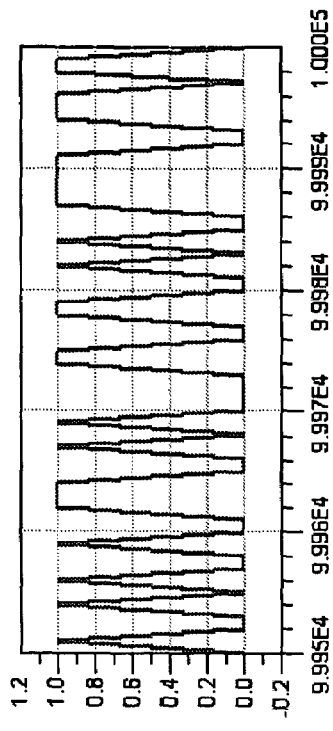
Figure 10:
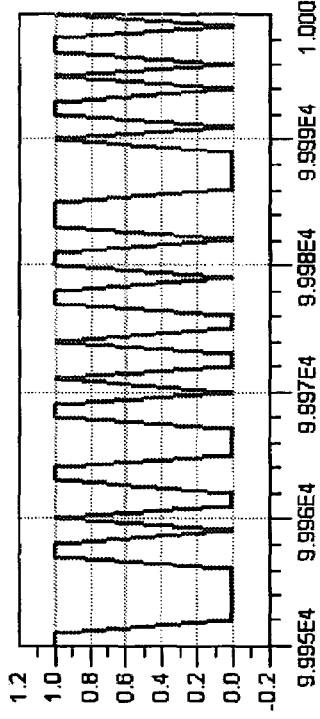
Figure 10:
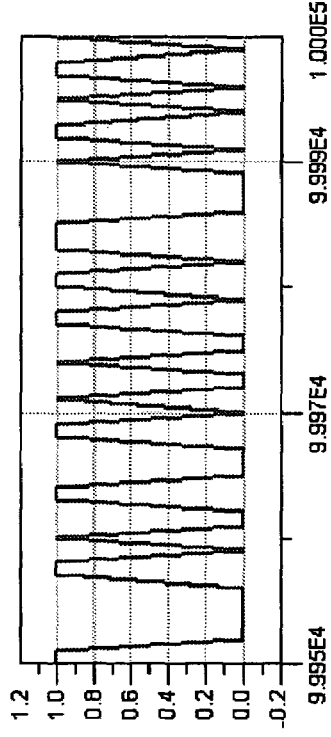

FIG. 10 shows binary data transmitted to a proposed radio receiver, and simulated received data. With appropriate reception power and analog circuit specifications, the bit errors rate in channel 1 (left) and channel 2 (right) are zero.

Figure 11:
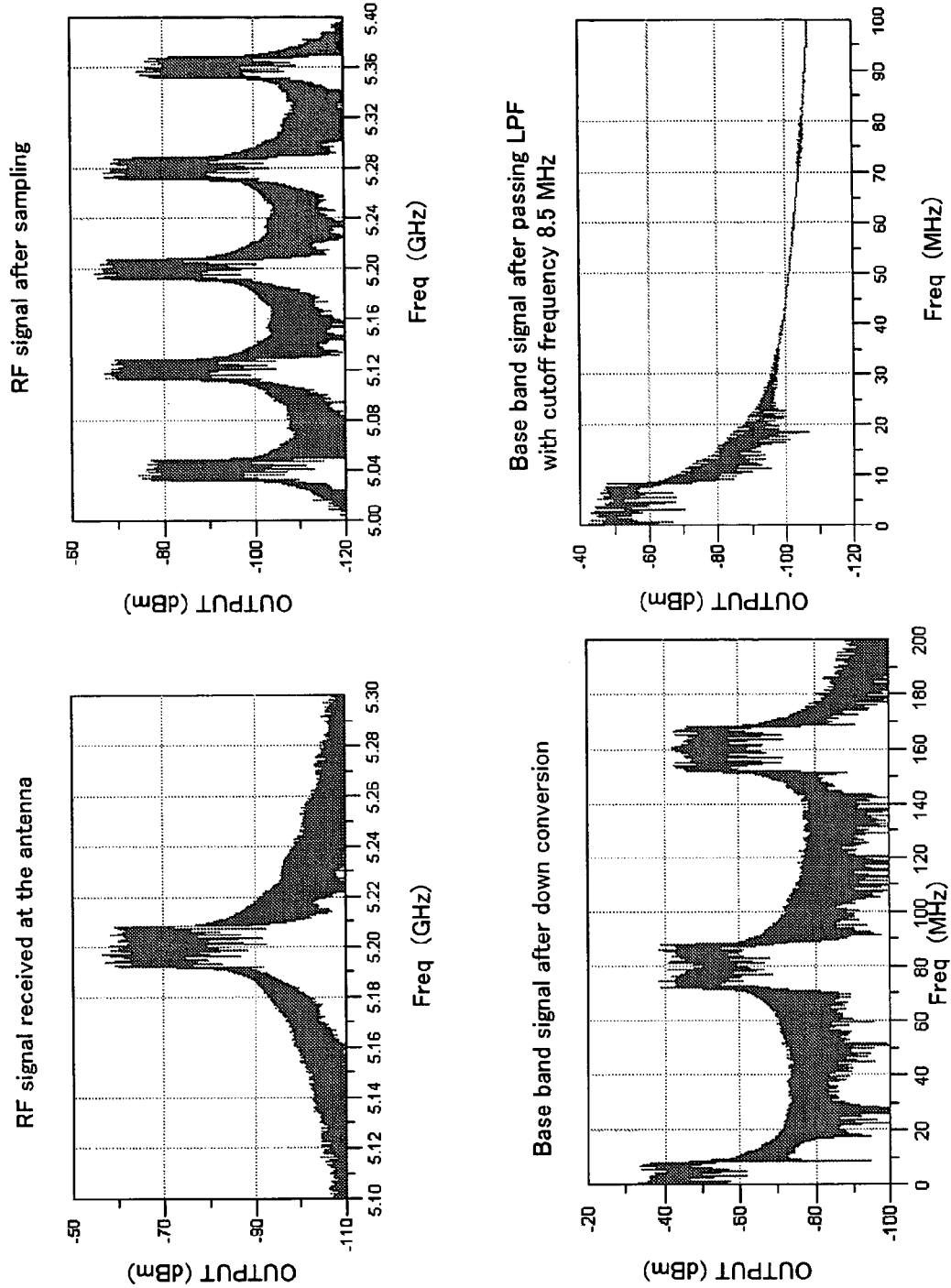
FIG. 11 shows spectra of a signal received through Rx1 shown in FIG. 8, the upper left spectrum is the spectrum of an RF signal received by a front-end, the upper right spectrum is the spectrum of a sampled RF signal, the lower left spectrum is the spectrum of a baseband signal after downconversion into DC, and the lower right spectrum is the spectrum of a baseband signal after passing through the LPF.

FIG. 11 shows a spectrum for the signal received through the first receiver (Rx1 shown in FIG. 8). The upper left portion in FIG. 11 shows the spectrum of the RF signal of bandwidth of 16.25 MHz centered at 2 GHz and received by the front-end. The upper right portion shown in FIG. 11 shows a spectrum of the sampled RF signal.

In the upper right portion, replicas appear at an interval of 80 MHz apart from each other. The lower left portion shown in FIG. 11 shows the spectrum of the baseband signal after downconversion to DC. A desired signal occupies the bandwidth from the DC to 8.125 MHz. The lower right portion shown in FIG. 11 shows the spectrum of the baseband signal after passing through an LPF having a cutoff frequency of 8.5 MHz. As shown in FIG. 11, replicas are removed, and the desired signal is obtained.

Although a system and method according to the present invention has been described in connection with one or more preferred embodiments, it is not intended that the invention be limited to be the specific form set forth herein, but on the contrary, it is intended to cover such alternatives, modifications, and equivalents, as can be reasonably included within the spirit and scope of the invention as defined by the appended claims.

What is claimed is:

1. A radio receiver, comprising:
an antenna array having N (N is an integer≧2) antenna elements for receiving an RF signal;
an N:1 multiplexer, for multiplexing N channel signals received via the N antenna elements into one signal;
a downconverter, for downconverting the multiplexed signal to a baseband;
two 1:N analog demultiplexers, for demultiplexing N combined and downconverted received signals into N in-phase signal elements and N quadrature-phase signal elements;
2N low-pass filters, for filtering and reconstructing a baseband signal of the N in-phase signal elements and the N quadrature-phase signal elements; and
2N A/D converters, for converting a reconstructed received signal to a digital signal.

2. The radio receiver according to claim 1, wherein the N:1 multiplexer is configured by N switch elements.

3. The radio receiver according to claim 2, wherein the N switch elements are N MOSFETs, and the N MOSFETs sample N received signals, the N sampled signals are multiplexed into one channel.

4. The radio receiver according to claim 3, further comprising
a variable gain amplifier, coupled to the outputs of the N MOSFET switches, for amplifying the multiplexed signals.

5. The radio receiver according to claim 2, wherein the N switch elements are N switching LNAs, the N switching LNAs sample N received signals, and the outputs of N switching LNAs are multiplexed into one channel.

6. The radio receiver according to claim 5, further comprising
a variable gain LNA, coupled to the outputs of the N switching LNAs, for controlling the gain to prevent saturation of the multiplexed signals or providing bigger gain to increase SNR.

7. The radio receiver according to claim 2, further comprising
a digital signal processor generating N clock sequences, wherein
the N switch elements are sequentially switched by the control of the N generated clock sequences.

8. The radio receiver according to claim 7, wherein the digital signal processor generates N clock sequences so that at any given time only one switch element is in the ON state.

9. The radio receiver according to claim 7, wherein the digital signal processor generates the N clock sequences such that the received signals can be sampled at a rate lower than a carrier frequency, and higher than double the bandwidth of the received signals.

10. The radio receiver according to claim 7, wherein the outputs of the 1:N analog demultiplexers are controlled by the N clock sequences generated by the digital signal processor.

11. The radio receiver according to claim 10, wherein a clock sequence to control the demultiplexer has the same pulse period as a clock sequence to control the multiplexer; and has a pulse width equal to or smaller than the clock sequence of the multiplexer.

12. The radio receiver according to claim 11, wherein a BPF of variable bandwidth, is coupled to the output of each receiver antenna.

13. The radio receiver according to claim 1, further comprising
2N variable gain amplifiers to adjust the power level of a signal at a stage before the 2N A/D converters.

14. The radio receiver according to claim 1, further comprising
N band pass filters for performing a filtering process of the received signal before sampling the received signal in the N:1 multiplexer.

15. The radio receiver according to claim 1, wherein a band pass filter (BPF) of variable bandwidth, is coupled to the output of each receiver antenna.

16. The radio receiver according to claim 1, wherein a feature of a BPF having a desired bandwidth, is added to the adjustment circuit of an LNA.

17. A radio receiver, comprising:
an antenna array having N (N is an integer≧2) antenna elements for receiving an RF signal;
an N:1 multiplexer, for multiplexing N channel signals received via the N antenna elements into one signal;
a downconverter, for downconverting the multiplexed signal to a baseband;
two A/D converters, coupled to the in-phase output and the quadrature-phase output of the downconverter;
two 1:N digital demultiplexers, coupled to the outputs of the A/D converters, for demultiplexing the combined N received signals into in-phase and quadrature-phase; and
2N digital low-pass filters, coupled to the outputs of the two 1:N digital demultiplexers, for reconstructing the N received baseband signals.

18. The radio receiver according to claim 17, wherein the N:1 multiplexer is configured by N switch elements.

19. The radio receiver according to claim 18, wherein the N switch elements are N MOSFETs, and the N MOSFETs sample N received signals, and the N sampled signals are multiplexed into one channel.

20. The radio receiver according to claim 19 further comprising
a variable gain amplifier, coupled to the outputs of the N MOSFET switches, for amplifying the multiplexed signals.

21. The radio receiver according to claim 18, wherein
the N switch elements are N switching LNAs, the N switching LNAs sample N received signals, and the outputs of N switching LNAs are multiplexed into one channel.

22. The radio receiver according to claim 21, further comprising
a variable gain LNA, coupled to the outputs of the N switching LNAs, for controlling the gain to prevent saturation of the multiplexed signals or providing bigger gain to increase SNR.

23. The radio receiver according to claim 18, further comprising
a digital signal processor generating N clock sequences, wherein
the N switch elements are sequentially switched by the control of the N generated clock sequences.

24. The radio receiver according to claim 23, wherein
the digital signal processor generates N clock sequences so that at any given time only one switch element is in the ON state.

25. The radio receiver according to claim 23, wherein
the digital signal processor generates the N clock sequences such that the received signals can be sampled at a rate lower than a carrier frequency, and higher than double the bandwidth of the received signals.

26. The radio receiver according to claim 23, wherein
the outputs of the 1:N analog demultiplexers are controlled by the N clock sequences generated by the digital signal processor.

27. The radio receiver according to claim 26, wherein
a clock sequence to control the demultiplexer has the same pulse period as a clock sequence to control the multiplexer; and has a pulse width equal to or smaller than the clock sequence of the multiplexer.

28. The radio receiver according to claim 17, further comprising
two variable gain amplifiers to adjust the power level of a signal at a stage before the two A/D converters.

29. The radio receiver according to claim 17, further comprising
N band pass filters for performing a filtering process of the received signal before sampling the received signal in the N:1 multiplexer.

30. The radio receiver according to claim 17, wherein
an anti-aliasing filter for attenuating frequency elements higher than the loop-back frequency is added between the downconverter and the A/D converters.

31. The radio receiver according to claim 17, wherein
a feature of a BPF having a desired bandwidth is added to the adjustment circuit of an LNA.

32. A method for processing a signal of a radio receiver, comprising:
multiplexing N channel signals received through N (N is an integer equal to or larger than 2) antenna elements into one output using an N:1 multiplexer;
downconverting the multiplexed signal to a baseband using a downconverter;
demultiplexing a combined and downconverted received signal into N in-phase signal elements and N quadrature-phase signal elements using two 1:N analog demultiplexers;
filtering and reconstructing baseband signals having N in-phase signal elements or N quadrature-phase signal elements using 2N low-pass filters; and
converting the reconfigured received signal to a digital signal using 2N A/D converters.

33. The method of processing a signal of a radio receiver according to claim 32, wherein
a BPF of variable bandwidth is coupled to the output of each receiver antenna.

34. The method of processing a signal of a radio receiver according to claim 32, wherein
a feature of a BPF having a desired bandwidth, is added to the adjustment circuit of an LNA.

35. A method of processing a signal of a radio receiver, comprising:
multiplexing N channel signals received through N (N is an integer equal to or larger than 2) antenna elements into one output using an N:1 multiplexer;
downconverting the multiplexed signal to a baseband using a downconverter;
converting in-phase output and quadrature-phase output of the downconverter to a digital signal using two A/D converters;
demultiplexing the N combined and converted digital received signals into in-phase and quadrature-phase using two 1:N digital demultiplexers; and
channel-filtering and regenerating baseband signals of N demultiplexed in-phase signal elements or N demultiplexed quadrature-phase signal elements using 2N digital low-pass filters.

36. The method of processing a signal of a radio receiver according to claim 35, wherein
a BPF of variable bandwidth is coupled to the output of each receiver antenna.

37. The-method of processing a signal of a radio receiver according to claim 35, wherein
a feature of a BPF having a desired bandwidth is added to the adjustment circuit of an LNA.

* * * * *